United States Patent Office 3,104,934
Patented Sept. 24, 1963

3,104,934
POLYPYRROLIDONE TREATMENT OF POLY-
ACRYLONITRILE GEL FIBERS AND THE
PRODUCT THEREOF
Norman Blumenkopf, North Merrick, N.Y., assignor to
General Aniline & Film Corporation, New York, N.Y.,
a corporation of Delaware
No Drawing. Filed July 28, 1959, Ser. No. 829,961
17 Claims. (Cl. 8—115.5)

This invention relates to a new process for the preparation of resinous compositions and the compositions resulting thereby, and specifically to a process for improving acrylonitrile containing polymers by the impregnation thereof with water soluble forms of polypyrrolidone.

The acrylic resins, and specifically polyacrylonitrile resins, are admirably suited for the production of fibers which can be spun and employed as a textile fiber. Such fibers have outstanding physical properties such as high sticking temperatures, excellent strength, and superior resistance to shrinkage at elevated temperatures. In the last few years, textiles composed primarily of such fibers, or containing such fibers, have assumed an outstanding prominence in the field due to the aforementioned outstanding properties, in addition to many other desirable attributes which one looks for in a textile material. Great inroads in the wool market have been made by this fiber, either as the homopolymer, as the copolymer, or as a modified homopolymer. There have been vast strides towards improving certain deficiencies of the polymers, and particularly in improving the dyeability and hand thereof. There are characteristics, nevertheless, of these fibers which still require improvement. Among these are improved water absorption characteristics, and particularly antistatic properties. In addition, there is a continuing search for better dyeability since even today many dyes are not effective with the acrylic fibers, and many others require involved and expensive dyeing procedures. There is still room for improvement towards a better hand for such fabric materials.

It has heretofore been discovered that by combining polyacrylonitrile, either as a homopolymer or as a major constituent of a graft polymer or copolymer, with polypyrrolidone, the aforemented advantages of the acrylic fibers are not deleteriously affected, and at the same time vast improvements of dyeability and other properties are forthcoming. This subject matter is disclosed and claimed in copending application Serial No. 821,687, filed June 22, 1959, now Patent No. 3,033,813.

It has now been discovered that a still further and unexpected improvement in the various desirable properties of acrylic fibers is forthcoming with acrylonitrile-containing polymeric materials in a state in which they are receptive to hydrophilic substances may be impregnated with water soluble forms of polypyrrolidone, and thereafter the impregnated material rendered water insensitive, or hydrophobic. The composite structure resulting from this process has outstanding antistatic properties, and its dyeability is far superior to any other heretofore known combinations of acrylonitrile polymers.

It is therefore an object of this invention to provide a new process for the preparation of acrylonitrile containing polymeric compositions.

It is another object of this invention to provide a new process whereby acrylonitrile containing polymeric materials are combined with polypyrrolidone.

It is still another object of this invention to provide new compositions comprising the combination of acrylonitrile containing polymeric materials with water soluble forms of polypyrrolidone.

It is a still further object of this invention to provide compositions resulting from the aforementioned processes.

Still another object of this invention is to provide fibers resulting from the compositions produced by the processes of this invention.

Other objects will appear hereinafter as the description proceeds.

It has been known that polymeric acrylonitrile and acrylonitrile-containing polymeric substances can be dissolved in and spun from aqueous solutions of various metal salts. Upon the extrusion through spinnerettes of such solutions into coagulating mediums which may be water, dilute salt solutions or dilute acid solutions, there is formed a swollen aquagel structure from which fibers can be prepared. The formation of fibers from the aquagel involves a series of stretching, washing and drying operations. It has been discovered that by the treatment of the aquagel structure at any stage before the final drying step, and that is at any stage during which the fibers exhibit hydrophilic properties, it is possible to impregnate this aquagel with a water soluble form of polypyrrolidone which is readily absorbable by the aquagel and which upon subsequent drying operations integrally merges with the acrylonitrile component of the fiber to yield a composite structure the nature of which is not fully understood. Upon subsequent drying operations, all of the components of the fiber are converted to the hydrophobic state, or at least to the water insoluble state. The water soluble polypyrrolidones contemplated herein are believed to react with the acrylonitrile moiety of the polymeric constituents of the fibers or filaments to yield a product which is in the nature of a grafted polymer. It is to be understood that the exact mechanism is not known and therefore this invention, the processes and the compositions derived therefrom are not to be limited by the particular mechanism suggested whereby the vast improvements are forthcoming.

Polypyrrolidone is a product derived from the polymerization of a $\alpha$-pyrrolidone. Pyrrolidone, which is gamma-butyrolactam, is capable of undergoing polymerization to yield a superpolyamide. Such polymerization procedures are described in U.S. Patent 2,638,463, and today polypyrrolidone is a well known polymeric product.

The water soluble polypyrrolidones which are contemplated in the processes and compositions of this invention are the known N-methylol derivatives described in U.S. Patent 2,734,004. As discussed in this patent, polypyrrolidone exists in varying molecular weights and any one of such materials may be used as the precursor for the N-methylol compounds. In order to obtain water soluble derivatives in general, it is necessary to employ those polypyrrolidones having lower molecular weights. A low relative viscosity of the polymer is a direct manifestation of the low molecular weight, and it is these products which are contemplated herein. Some of the methylol polypyrrolidones are intermediate between water soluble and water insoluble and tend to form in water colloidal suspensions or gels. These products are also suitable for use in the present process.

The acrylonitrile containing polymeric materials which are to be treated or impregnated with the water soluble polypyrrolidones include, in addition to the homopolymer or acrylonitrile, any of the copolymers, terpolymers, interpolymers and graft polymers containing at least 60% acrylonitrile. The materials and/or compounds which may be used with acrylonitrile to form any of the aforementioned acrylonitrile containing polymeric substances, whether by way of copolymerization, terpolymerization, interpolymerization, or graft polymerization include the general class of ethylenically unsaturated compounds such as vinyl chloride, vinyl acetate, acrylic acid, methyl acrylate, ethyl acrylate, acrylamide, methacrylic acid, methyl methacrylate, ethyl methacrylate, methacrylamide, vinyl pyridine, styrene, vinyl alcohol, methacrylonitrile, maleate ester, e.g., diethyl maleate, isopropenyl acetate, fumaronitrile, vinylidine chloride, vinyl methyl ethers, e.g., vinyl ethyl ether, and other similar polymerizable ethylenically unsaturated compounds.

The amount of water soluble polypyrrolidone based on the weight of the acrylic fiber may be varied from as little as 1% up to about 50% depending upon the particular nature of the acrylic fiber to be treated. In all instances, however, it is preferred that in the final product the overall acrylonitrile content should not be less than about 50%. Thus, where acrylic fibers containing the minimum 60% acrylonitrile content are to be treated, such a product, in order to have present in the final fiber at least 50% acrylonitrile content, should not contain more than 17% of the polypyrrolidone product.

The spun fibers, after impregnation, are, as described above, heat treated in order to effect water insolubilization of the impregnant as well as conversion of the acrylonitrile polymer aquagel to the hydrophobic state. Such insolubilization and conversion may be effected at temperatures from about 70° C. to about 200° C. At 70° C. several hours may be necessary for this conversion, while at 200° C. a satisfactory fiber is obtained within about 5 minutes. It is preferred, however, to operate within a temperature range of from about 90 to about 150° C. At the latter temperature substantial conversion and insolubilization is achieved in about 10 minutes. While it has been stated above that the range of the water soluble polypyrrolidone based on the weight of the impregnated fiber may vary from 1 to 50%, it is preferred to employ amounts from about 10 to 25% since the most outstanding benefits derived from this invention are achieved within this range.

In addition to homopolymeric acrylonitrile, the following specific examples of copolymers and graft polymers are given by way of illustration:

(1) Copolymer—
   95% acrylonitrile
   5% vinyl pyridine
(2) Copolymer—
   90% acrylonitrile
   10% methacrylamide
(3) Copolymer—
   88% acrylonitrile
   12% N-methyl methacrylate
(4) Copolymer—
   92% acrylonitrile
   8% ethyl vinyl ether
(5) Copolymer—
   60% acrylonitrile
   40% methacrylonitrile
(6) Copolymer—
   90% acrylonitrile
   10% vinyl acetate
(7) Copolymer—
   94% acryonitrile
   6% methacrylate
(8) Copolymer—
   90% acrylonitrile
   10% methyl methacrylate
(9) Copolymer—
   70% acrylonitrile
   30% ethyl acrylate
(10) Copolymer—
   60% acrylonitrile
   40% vinyl propionate
(11) Copolymer—
   65% acrylonitrile
   35% isopropyl vinyl ether
(12) Graft polymer—
   70% acrylonitrile
   30% vinyl alcohol The following examples will serve to illustrate the present invention without being deemed limitative thereof.

EXAMPLE 1

A solution of 5 gr. polyacrylonitrile (homopolymer, specific viscosity 3.8) in 95 parts of a 50% aqueous zinc chloride solution is extruded through a 10 mil 100 hole spinnerette into a 1% aqueous hydrochloric acid coagulating bath. The unstretched tow is washed and then impregnated with a 10% aqueous solution of an N-methylol derivative of polypyrrolidone.

Part A

The aforementioned aqueous solution is prepared by dissolving 10 gr. of polypyrrolidone (relative viscosity, 5.1) in 60 mls. of 70% glycolic acid at 60° C. To this solution there is then added a solution of 5 gr. of paraformaldehyde dissolved in 8 mls. of water. The mixture is stirred and held at 60° C. for 1 hr. Thereafter it is diluted with 200 mls. of water and filtered to remove any insolubles. The filtrate is then concentrated by boiling off the water until it contains 10% solids.

Part B

The homopolymeric acrylonitrile tow in the aquagel condition is steeped in the 10% N-methylol polypyrrolidone (T=30° C.) until the fibers have absorbed 5% thereof. The tow is then removed from the impregnating solution, stretched to 8 times its original length in moist steam and then dried for 10 minutes at 150° C. The resulting filaments are thereafter wound and twisted to yield a 30 filament yarn which has a dry tenacity of 2.8 gr. per denier.

EXAMPLE 2

1 gr. of the yarn of Example 1 is immersed in a dyebath containing 125 mg. of Genacryl Pink 3G, a basic dye, in 350 mls. of water at the boil. After 2 hours, the yarn is removed and dried. Excellent exhaust and levelness of dyeing is obtained. In the standard AATCC Wash Test #3, there is no loss of color.

EXAMPLE 3

A homopolymeric acrylonitrile yarn is prepared as in Example 1, except that the subsequent impregnation is omitted. Dyeings on this fiber in the manner set forth in Example 2 are very poor. There is poor exhaust from the dyebath, and the color retention properties of the yarn are very deficient.

EXAMPLE 4

Example 1, complete, is again repeated except that the aquagel tow is steeped in the impregnant until the fibers have absorbed 10% thereof (temperature at 45° C.). Dyeings on the resultant yarn in the manner similar to Example 2 yield comparable results.

EXAMPLE 5

Part A

A 20% solution in water of an N-methylol polypyrrolidone is prepared as in Part A of Example 1, employing, however, a polypyrrolidone having a relative viscosity of 1.7.

Part B

A homopolyacrylonitrile tow in aquagel form as prepared in Example 1 is immersed in the aforementioned 20% impregnant solution at a temperature of 25° C. until the fibers have absorbed 15% impregnant (dry weight) based on the weight of the impregnated fibers. The tow is then stretched to ten times its original length in moist steam and dried for 3 minutes at 200° C. A 30 filament yarn is prepared from these filaments, which yarn has a dry tenacity of 3.0 gr. per denier.

EXAMPLE 6

The yarn of Example 5 is dyed as in Example 2 above to yield comparable dyeings.

EXAMPLE 7

The yarn of Example 5 is employed in a dyebath similar to that of Example 2 except that the dyestuff used is Alizarin Cyanin Green GHN concentrate. Outstanding levelness of dyeing is obtained with excellent exhaust. The color retention characteristics in the AATCC Wash Test #3 is superior.

EXAMPLE 8

Example 5 is again repeated except that the temperature of the impregnating bath is maintained at 50° C. and the pickup by the fibers yields 20% impregnant dry weight based on the weight of the impregnating fibers. Dyeings carried out as in Examples 6 and 7 are again outstanding.

EXAMPLE 9

The procedure of Example 5 is again repeated except that the temperature of the impregnating bath is maintained at 80° C. After equilibrium has been reached, it is found that the wet pickup is about 200% based on the weight of the aquagel. The resultant impregnated and dried fibers are found to contain 42% impregnant dry weight based on the weight of the impregnated fibers.

EXAMPLE 10

The procedure of Example 5 is again repeated except that the temperature of the impregnating bath is 100° C. After equilibrium has been reached in the bath and the fibers stretched and dried, they are found to contain 50% impregnant dry weight based upon the weight of the impregnated fibers.

EXAMPLE 11

The procedure of Example 1, Part A, is repeated except that a polypyrrolidone having a relative viscosity of 3.0 is used. As in this example, a 10% solution of the water soluble polypyrrolidone is prepared. The fibers of a homopolymer as described in Example 1 are prepared and steeped in the aforementioned impregnating bath at room temperature for 10 seconds. The resultant fibers, after stretching and drying (carried out as in Example 1) are found to contain 1% impregnant dry weight based on the weight of the impregnated fibers.

EXAMPLE 12

Part A

To a solution of 10 gr. of paraformaldehyde dissolved in 75 ml. of 70% glycolic acid held at 60° C., there is added 5 gr. of finely divided polypyrrolidone (relative viscosity 8.3). The mixture is stirred and maintained at 60° C. for 40 minutes. After cooling, the reaction mixture is worked up as described in Example 1, to yield a 20% solution.

Part B

A homoployacrylonitrile aquagel tow prepared as in Example 1 is immersed in the solution described in Part A for 30 minutes. The resulting impregnated tow is then stretched to nine times its original length in moist steam and dried for 15 minutes at 160° C. The resultant product is found to contain 25% impregnant dry weight based upon the weight of the impregnated fibers. Outstanding dyeings are obtained on this impregnated product.

EXAMPLE 13

Example 1 is repeated except that in place of the homopolymer of acrylonitrile there is used a copolymer containing 95% acryonitrile and 5% vinyl pyrridine.

EXAMPLES 14–25

In the following examples, Example 1 is repeated except that in place of the homopolymer of acrylonitrile, copolymers of the following composition are used:

(14) Copolymer—
   90% acrylonitrile
   10% methacrylamide
(15) Copolymer—
   90% acrylonitrile
   10% methacrylamide, N-methyl
(16) Copolymer—
   88% acrylonitrile
   12% N-methyl methacrylate
(17) Copolymer—
   92% acrylonitrile
   8% ethyl vinyl ether
(18) Copolymer—
   60% acrylonitrile
   40% methacrylonitrile
(19) Copolymer—
   90% acrylonitrile
   10% vinyl acetate
(20) Copolymer—
   94% acrylonitrile
   6% methacrylate
(21) Copolymer—
   90% acrylonitrile
   10% methyl methacrylate
(22) Copolymer—
   70% acrylonitrile
   30% ethyl acrylate
(23) Copolymer—
   60% acrylonitrile
   40% vinyl propionate
(24) Copolymer—
   65% acrylonitrile
   35% isopropyl vinyl ether
(25) Graft polymer—
   70% acrylonitrile
   30% vinyl alcohol

EXAMPLES 26–31

In the following examples, Example 8 is repeated, that is, to yield an impregnated content of 20% dry weight based on the weight of the impregnated fibers using the following copolymers in lieu of the homopolymer of Example 8:

(26) Copolymer—
   95% acrylonitrile
   5% vinyl pyridine
(27) Copolymer—
   90% acrylonitrile
   10% methacrylamide
(28) Copolymer—
   90% acrylonitrile
   10% vinyl acetate
(29) Copolymer—
   90% acrylonitrile
   10% methyl methacrylate
(30) Copolymer—
   70% acrylonitrile
   30% ethyl acrylate
(31) Copolymer—
   65% acrylonitrile
   35% isopropyl vinyl ether

EXAMPLES 32–38

In the following examples, Example 9 is repeated to yield a 42% impregnant content dry weight based on the weight of the impregnated fibers using the following copolymers in in lieu of the homopolymer of Example 9:

(32) Copolymer—
   95% acrylonitrile
   5% vinyl pyridine

(33) Copolymer—
    90% acrylonitrile
    10% methacrylamide
(34) Copolymer—
    88% acrylonitrile
    12% N-methyl methacrylate
(35) Copolymer—
    92% acrylonitrile
    8% ethyl vinyl ether
(36) Copolymer—
    90% acrylonitrile
    10% vinyl acetate
(37) Copolymer—
    94% acrylonitrile
    6% methacrylate
(38) Copolymer—
    90% acrylonitrile
    10% methyl methacrylate

EXAMPLE 39

A textile prepared from homopolymeric untreated acrylonitrile is tested for its static properties employing the AATCC Test Procedure 76–1954, and was found to have a value of 14. Such a value indicates that the material has a very high electrical resistance, and therefore is prone to the development of high static charge.

EXAMPLE 40

The yarn produced in Example 1 is made into a textile fabric and tested similarly as in Example 39. A value of 9 is obtained. This indicates a relatively low electrical resistance, and therefore good antistatic properties.

EXAMPLE 41

Fabrics are prepared from the fibers or yarns of Examples 5, 8 and 9. The values obtained in the aforementioned AATCC static test procedure are 9, 8, 8, respectively, for the said fabrics, again indicating superior antistatic properties of the fibers produced in accordance with the present invention.

All of the products produced in the present invention not only exhibit outstanding dyeing characteristics, but in addition thereto, are possessed of a superior hand readily noticeable when the yarns are used to manufacture textile products. In addition, such products exhibit to a far less degree the undesirable static properties of the untreated homopolymers and copolymers of acrylonitrile. Further, as exemplified above, the polypyrrolidones which may be used in the present invention to prepare the water soluble derivatives thereof are those characterized by having relative viscosities of from about 1.5 to about 10.0. The temperature of the impregnating baths containing the water soluble polypyrrolidones during the impregnation step may be varied considerably depending upon the degree of impregnation desired. Any temperatures from about 0° C. up to about 100° C. may be used provided the impregnating bath is in a suitable liquid condition. While the exemplifications of the present invention as given above have been directed specifically to fibers, it is obvious that this invention may similarly be directed to the treatment of the acrylonitrile containing polymeric aquagels in the form of sheets and films as well as any other shape or form desired.

Other variations in and modifications of the described processes which will be obvious to those skilled in the art can be made in this invention without departing from the scope or spirit thereof.

I claim:

1. A process which comprises impregnating a polymer aquagel containing at least 60% acrylonitrile with a water soluble N-methylol derivative of polypyrrolidone and then heating the impregnated material to a temperature from about 70° C. to about 200° C. to effect water insolubilization of the entire mass.

2. A process which comprises impregnating a polymer aquagel containing at least 85% acrylonitrile with a water soluble N-methylol derivative of polypyrrolidone and then heating the impregnated material to a temperature from about 70° C. to about 200° C. to effect water insolubilization of the entire mass.

3. A process which comprises impregnating a copolymer aquagel containing 95% acrylonitrile and 5% vinyl pyridine with a water soluble N-methylol derivative of polypyrrolidone and then heating the impregnated material to a temperature from about 70° C. to about 200° C. to effect water insolubilization of the entire mass.

4. A process which comprises impregnating a copolymer aquagel containing 90% acrylonitrile and 10% methacrylamide with a water soluble N-methylol derivative of polypyrrolidone and then heating the impregnated material to a temperature from about 70° C. to about 200° C. to effect water insolubilization of the entire mass.

5. A process which comprises impregnating a copolymer aquagel containing 85% acrylonitrile and 15% styrene with a water soluble N-methylol derivative of polypyrrolidone and then heating the impregnated material to a temperature from about 70° C. to about 200° C. to effect water insolubilization of the entire mass.

6. A process which comprises impregnating a copolymer aquagel containing 88% acrylonitrile and 12% N-methyl methacrylate with a water soluble N-methylol derivative of polypyrrolidone and then heating the impregnated material to a temperature from about 70° C. to about 200° C. to effect water insolubilization of the entire mass.

7. A process which comprises impregnating a copolymer aquagel containing 60% acrylonitrile and 40% methacrylonitrile with a water soluble N-methylol derivative of polypyrrolidone and then heating the impregnated material to a temperature from about 70° C. to about 200° C. to effect water insolubilization of the entire mass.

8. A process which comprises impregnating a graft polymer aquagel containing at least 60% acrylonitrile with a water soluble N-methylol derivative of polypyrrolidone and then heating the impregnated material to a temperature from about 70° C. to about 200° C. to effect water insolubilization of the entire mass.

9. A process which comprises impregnating a graft polymer aquagel containing 70% acrylonitrile and combined polyvinyl alcohol of 30% with a water soluble N-methylol derivative of polypyrrolidone and then heating the impregnated material to a temperature from about 70° C. to about 200° C. to effect water insolubilization of the entire mass.

10. A process which comprises impregnating a polymer aquagel containing at least 60% acrylonitrile with a water soluble N-methylol derivative of polypyrrolidone and then heating the impregnated material to a temperature of from about 70° C. to 200° C. to effect water insolubilization of the entire mass.

11. A process which comprises impregnating a polymer aquagel containing at least 60% acrylonitrile with a water soluble N-methylol derivative of polypyrrolidone and then heating the impregnated material to a temperature of about 100° C. to effect water insolubilization of the entire mass.

12. A process which comprises impregnating a polymer aquagel containing at least 60% acrylonitrile with from 1% to about 50% by weight based on the weight of the impregnated material of a water soluble N-methylol derivative of polypyrrolidone and then heating the impregnated material to a temperature from about 70° C. to about 200° C. to effect water insolubilization of the entire mass, the final product containing at least 50% polyacrylonitrile by weight.

13. A process which comprises impregnating a polymer aquagel containing at least 60% acrylonitrile with from 1% to about 50% by weight based on the weight of the impregnated material of a water soluble N-methylol derivative of polypyrrolidone and then heating the impregnated material to a temperature of from about 70° C. to 200° C. to effect water insolubilization of the entire mass, the final product containing at least 50% polyacrylonitrile by weight.

14. A process which comprises impregnating a polymer aquagel containing at least 60% acrylonitrile with from about 10 to about 25% by weight based on the weight of the impregnated material of a water soluble N-methylol derivative of polypyrrolidone and then heating the impregnated material to a temperature of from about 70° C. to 200° C. to effect water insolubilization of the entire mass, the final product containing at least 50% polyacrylonitrile by weight.

15. A process which comprises impregnating a polymeric aquagel in the hydrophilic state, said aquagel containing at least 60% acrylonitrile with 10% by weight based on the weight of the impregnated product of a water soluble N-methylol derivative of polypyrrolidone and then heating the impregnated material to a temperature of about 100° C. to effect water insolubilization of the impregnated mass.

16. In a process in which a polymer containing at least 60% of acrylonitrile material in the polymer molecule is spun from an aqueous solution thereof into a coagulant, the spun product stretched, washed and dried to destroy the aquagel condition thereof, the improvement which comprises applying to the spun product while in the aquagel condition from about 1% to about 50% based on the weight of the treated product of a water soluble N-methylol derivative of polypyrrolidone and drying the treated product at a temperature of from about 70° C. to about 200° C. to effect water insolubilization thereof.

17. The product produced by the process of claim 1.

References Cited in the file of this patent

UNITED STATES PATENTS

| | | |
|---|---|---|
| 2,719,156 | De Benneville | Sept. 27, 1955 |
| 2,734,004 | Robinson | Feb. 7, 1956 |
| 2,871,223 | Hankins | Jan. 27, 1959 |
| 2,931,272 | Haas | Apr. 5, 1960 |